United States Patent [19]

Kollross

[11] Patent Number: 4,612,684

[45] Date of Patent: Sep. 23, 1986

[54] PROCESS AND APPARATUS FOR STRINGING LINK SAUSAGES MANUFACTURED ON AUTOMATIC STUFFING MACHINES ONTO CURING AND COOKING STICKS

[76] Inventor: Günter Kollross, Am Wallerstädter Weg 20, 6080 Gross-Gerau Dornheim, Fed. Rep. of Germany

[21] Appl. No.: 624,332

[22] Filed: Jun. 25, 1984

[30] Foreign Application Priority Data

Jun. 24, 1983 [DE] Fed. Rep. of Germany ....... 3322759

[51] Int. Cl.[4] .................. A22C 15/00; A22C 11/12
[52] U.S. Cl. ......................................... 17/45; 17/1 F; 17/33
[58] Field of Search ............... 17/44.2, 44.4, 42, 45

[56] References Cited

U.S. PATENT DOCUMENTS

| | | | |
|---|---|---|---|
| 3,951,262 | 4/1976 | Niedecker | 17/44.2 X |
| 4,044,450 | 8/1977 | Raudys et al. | 17/44.2 X |
| 4,227,668 | 10/1980 | Ernst | 17/44.2 X |
| 4,255,833 | 3/1981 | Niedecker | 17/44.4 |

FOREIGN PATENT DOCUMENTS

| | | | |
|---|---|---|---|
| 2950603 | 6/1981 | Fed. Rep. of Germany | 17/44.2 |
| 3202026 | 8/1983 | Fed. Rep. of Germany | 17/44.4 |

*Primary Examiner*—Willie G. Abercrombie
*Attorney, Agent, or Firm*—Larson and Taylor

[57] ABSTRACT

A process of stringing link sausages (112) produced on automatic stuffing machines, on curing or cooking sticks with the aid of suspension elements (34) which, after stuffing, upon sealing of the filled sausage casing lengths, singly will respectively be fed to a sealing clamp and tied thereby, in accordance with the invention resides in that the suspension elements (34), when fed to the sealing clamp, will be seized by a guiding element (106) and advanced by the latter with the sausage tied thereto, onto the curing or cooking stick. An apparatus for carrying into effect this process is provided with a gripping means (106) adapted to be introduced into the suspension element in the form of a suspension loop (34), simultaneously with the constricting tool (76) of a clamp setting mechanism, which gripping means forms part of a guiding means for transferring the suspension loop (34) with the sausage (112) tied thereto, to a floatingly supported curing or cooking stick.

19 Claims, 11 Drawing Figures

PROCESS AND APPARATUS FOR STRINGING LINK SAUSAGES MANUFACTURED ON AUTOMATIC STUFFING MACHINES ONTO CURING AND COOKING STICKS

DESCRIPTION

The present invention is concerned with a process of stringing link sausages manufactured on automatic stuffing machines onto curing and cooking sticks with the aid of suspension elements which after filling and during closing off the stuffed casing sections, singly, are respectively fed to closure clamping means and tied by the latter, and an apparatus for carrying into effect such a process.

A multiplicity of sausage types, especially the major caliber ones, after manufacture thereof on the automatic stuffing machines require a special additional treatment in smokehouses or cooking baths. For this purpose, the sausages, conventionally, are provided during manufacture thereof at one sausage end with a suspension element, mostly in the form of a suspension loop by which they are hung on so-called curing or cooking sticks for such an after-treatment.

Hitherto, such a stringing of the sausages onto the curing or cooking sticks has been performed manually by non-skilled personnel singly picking up the sausages manufactured by the stuffing automats and supplied by conveyor means of any desired type to hanging them onto the curing or cooking sticks mostly supported for this purpose at one end only. This is a hard and tiring job substantially increasing the share in wages of the production costs owing to the personnel required.

It is the object of the invention to avoid this manual operation to thereby decrease the costs of production.

In accordance with the invention, that problem is solved in that the suspension elements when placed ahead of the closure clamping means are seized by a guiding member advancing them with the sausage tied thereto to the curing or cooking stick.

Owing to the invention, the troublesome handling of the sausages for the purpose of hanging them on the curing or cooking sticks is eliminated, hence, requiring only operators for transporting away the threaded sausages to the smokehouse or to the cooking bath which can be performed in known manner on a correspondingly constructed carriage. The production costs for the sausages are substantially decreased thereby.

The process of the invention can be carried out in two different ways. According to a first feature for carrying into effect the process of the invention, the guiding member at least after tieing the suspension element is maintained at a standstill, with the suspension element on the guiding member being slidingly advanced to the curing or cooking stick. In this connection it is particularly advantageous for the guiding member to be maintained in an inclined position in order to utilize the force of gravity for the sliding of the suspension elements. Conversely, or additionally, the sliding movement of the suspension element on the guiding member can also be effected or at least supported by an artificially generated force.

Another way of carrying into effect the process of the invention is characterized in that the guiding member itself is moved for transporting the suspension element with the sausage tied thereto to the curing or cooking stick.

The suspension elements as such can be of different configurations. However, it is particularly feasible if premanufactured suspension loops or loops only formed upon presentation or tieing are used as suspension elements and if the curing or cooking sticks for receiving the suspension loops, in known manner, at one end are floatingly held.

The invention can be realized with special advantage in conjunction with a constricting and clamp setting mechanism disposed just downstream from the charging tube opening of the automatic stuffing machine, associated to which clamp setting mechanism is a means for individually feeding premanufactured, opened suspension loops into the path of movement of one of the constricting tools. Such systems are known per se; the loops can, for example, be taken from belts on which they are magazined in major amounts (see DE-PS No. 23 52 00 and DE-US No. 31 47 386). Equally, it will be possible for the loops to be formed only directly when placed or tied into the clamp closure.

In conjunction with such an arrangement, an apparatus for practically carrying into effect the process of the invention, in another form of embodiment of the invention, is characterized by a gripper means adapted to be introduced along with the constricting tool into the suspension loop as fed, with the gripping means forming part of a guiding means for transferring the suspension loop with the sausage tied thereto to a curing or cooking stick held in a floating manner.

Depending on one or the other of the afore-mentioned ways for carrying into effect the process of the invention, the apparatus is configured accordingly. In the former case, the said configuration is preferably such that the gripping means is located at the one end of a guide rail substantially extending in the direction of ejection of the forcemeat, with the other end thereof being adapted to be coupled to the curing or cooking stick. In this connection, it will be of advantage to dispose the guide rail inclined toward the curing or cooking stick; the curing or cooking stick can equally be arranged in an inclined position so as to permit the sausages to slide under gravitational force along the rail down to the curing or cooking stick coupled thereto, and along the latter for close abutment to one another.

According to another feature of an advantageous embodiment of such an apparatus, the guide rail is held by two or more clamping means which, for releasing the suspension loops sliding along the guide rail, are successively controllable. For that purpose, sensors for temporarily controlling the clamping means to open, detecting the sliding movement of the suspending loops on the guide rail, are feasibly associated to the clamping means, that can be formed as mechanical scanners or photocells with oppositely arranged light sources, or otherwise.

With the loop feeding mechanism correspondingly configured, the loop during feeding can be placed onto the gripping means, thus not requiring any special gripper movement for seizing the loops. However, as the loop material, as a rule, is relatively highly instable, in the majority of cases, it will be safer to positively introduce the gripper into the loop which, according to a special embodiment of the afore-mentioned apparatus according to the invention, can be realized in that the clamping means and, possibly, the sensors are displaceably disposed longitudinally of the guide rail and that an actuating means is provided which is able to reciprocate in controlled manner, the clamping means and the sensors for introducing the gripper into the suspension loop placed therebefore.

When using tubular material shirred in extended sections in caterpillar-type form for the manufacture of the sausages on the automatic stuffing machine which, while section-wise filled with forcemeat and while withdrawn from the charging tube, is closed off by respectively two clamps and is severed therebetween to form link sausages, the suspension loop can selectively be tied into the front or rear clamp of the two simultaneously set clamps. During tieing into the rear clamp, which closes off the front end of the hose section to be filled only subsequently for the next sausage, the loop, owing to the subsequent stuffing operation, automatically is slidingly displaced on the guide rail toward the curing or cooking stick on which it then can continue to slide automatically owing to a corresponding slope of the guide rail and of the curing or cooking stick. However, using the rear of the two closing clamps for tieing the suspension loop, involves the danger that in the event of an unanticipated stoppage of the sliding movement, the loop will break from the sausage tip or the sausage will burst which should be avoided in light of the damage or other inconvenience that will incur. It is, therefore, to be preferred to tie the suspension loop into the front of the two closing clamps that forms the rear tip of the already filled sausage singled by severing which, incidentally, also will always be done if premanufactured link sausage casings, i.e. those already previously closed at the front end, are processed on the automatic stuffing machine. In that case, it will be feasible if, according to a preferred embodiment of the afore-mentioned apparatus, an actuatable conveyor means is provided that extends below the path of ejection of the sausage, advancing the sausages to the curing and cooking stick, respectively.

An apparatus for carrying into effect the second type of process according to the invention, virtually, is characterized according to another embodiment of the invention, in that the guiding means is formed by an endless tape or chain drive provided with one or several engaging hooks seizing the suspension loops and supplying the same to the curing and cooking stick, respectively.

A preferred embodiment of the apparatus according to the invention is characterized by a mount for the curing and cooking stick, coupled to the guiding means, which mount comprises a frame and a head rotatable thereon and adapted to be indexed to the next position by equal graduation angles, with sockets for receiving a corresponding number of sticks in radial arrangement, one of which respectively joining the guide means.

The invention will now be described in closer detail with reference to an example of embodiment illustrated in the drawing, of an apparatus for carrying into effect the former type of process according to the invention, wherein FIG. 1 is a schematic side view of an apparatus for manufacturing link sausages, using a threading apparatus according to the invention but with the clamping means and the loop feeding means shown only partially;

FIG. 2 is a plan view of FIG. 1;

FIG. 3 in enlarged scale, is a front view of the constricting and closing mechanism and of the loop feeding means of the apparatus shown in FIGS. 1 and 2, with the constricting tools being opened, viewed in the direction of arrow III in FIG. 1;

Figure 1:
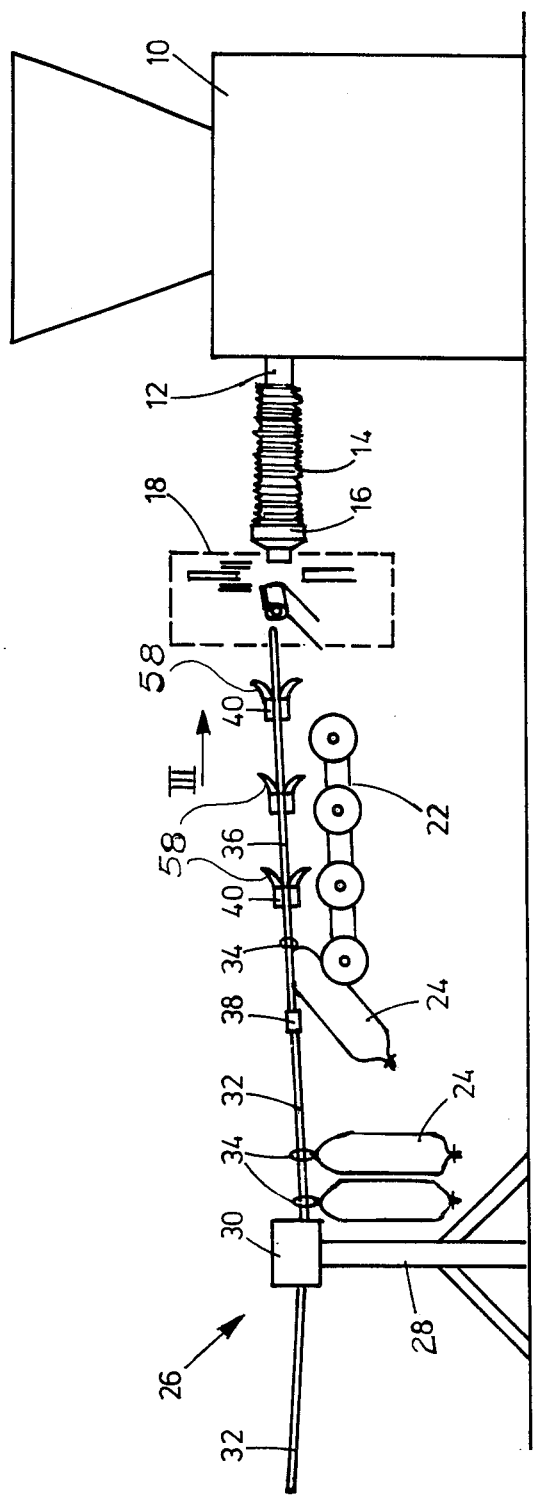
Figure 2:
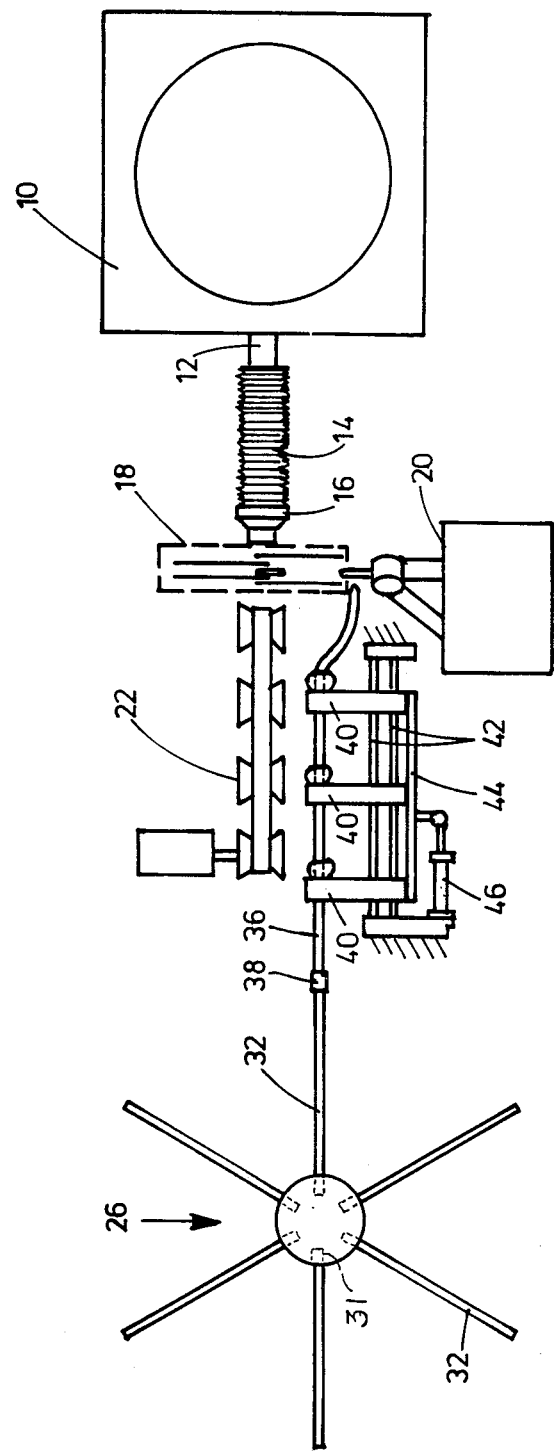

Referring to the drawings, in FIGS. 1 and 2, an automatic sausage stuffing machine is designated by reference numeral 10. The automatic stuffing machine includes a charging tube 12 for receiving tubular casing material 14 shirred in caterpillar form, which is closed at the front end projecting beyond the filling tube opening and, during stuffing with forcemeat through filling tube 12, is withdrawn through a resilient so-called casing brake 16 overlapping the filling tube end.

Ahead of the opening of charging tube 12 is disposed a constricting and closing mechanism designated in its entirety by reference numeral 18, which will be explained in greater detail below in conjunction with FIGS. 3 to 5 and 7 to 9. It is the function of that mechanism to close off the tubular material stuffed section-wise with forcemeat and to sever the same to form link sausages.

Associated to constricting and closing mechanism 18 is a loop feeding means schematically shown at 20. Moreover, coupled with the constricting and closing mechanism 18 is a belt conveyor means 22 inclined slightly downwardly, conveying sausages 24 manufactured by the automatic stuffing machine 10 and severed by the constricting and closing mechanism 18 toward a receiving means 26. Receiving means 26 comprises a frame 28 having a head 30 rotatable about the frame axis, with the head being provided, for example, with six sockets 31 circumferentially distributed, plugged into which are curing or cooking sticks 32. The plugged-in curing or cooking sticks 32, hence, in radial arrangement are held in floating manner in the receiving means 26 and are directed slightly upwardly owing to a corresponding configuration of the sockets. During transporting sausages 24 on the belt conveyor means 22 actuated by a driving motor (not shown), the loops 34 of the sausages 24 tied by the contricting and closing mechanism into the rear sausage end, are guided along a sloping guide rail 36, the raised front (upstream) end of which is formed as a gripper (as described in greater detail below) while the rear lower (downstream) end 38 thereof overlaps one of the curing and cooking sticks 32 held by receiving means 26 in a manner that the loops 34 of the sausages 24 can smoothly slide from the rail guide 36 to the curing and cooking stick 32.

Guide rail 36, in the example described, is held by three identically configured clamping means (FIG. 6) displaceably disposed on two parallel carriage guiding rods 42 and jointly reciprocable longitudinally of guide rod 36 by about 50 mm by a power cylinder 46 engaging a connecting rod 44.

Figure 6:
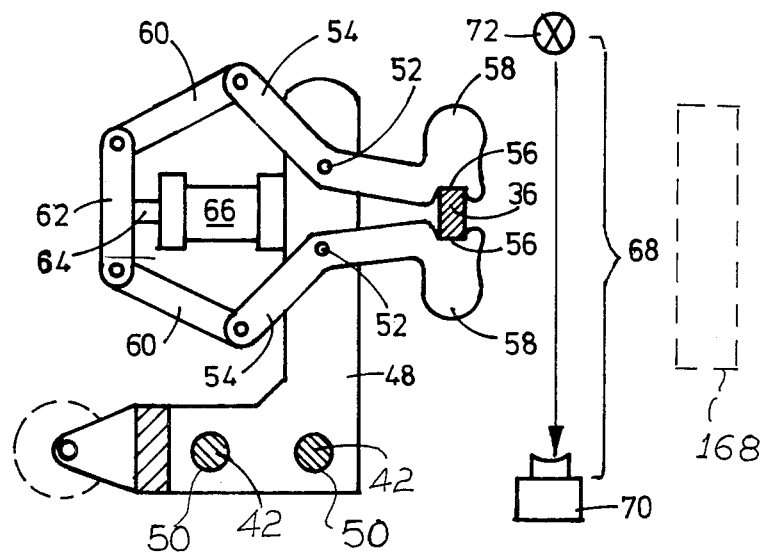
FIG. 6 shows a clamping means for the guide rail of the stringing apparatus.

As individually shown in FIG. 6, each clamping means 40 comprises an L-shaped holder 48 the horizontal leg of which includes bores 50 by which holder 48 is displaceably held on the carriage guiding rails 42. The perpendicular leg of holder 48 is held on bolts 52 having two mirror-image, identically formed, two-legged clamping arms 54, the one arm of which include jaw openings 56 for receiving and clamping the guide rail 36. On the side facing the stuffing machine, lugs 58 are provided on the said arms to form an intake horn. The other arms on the clamping levers 54 bent away from one another via connectors 60 are pivotally connected to a cross-bar 62 provided on the piston rod 64 of a double-acting pneumatic power cylinder 66 secured to holder 48. During extension of the piston rod 64, the clamping levers 54 with the arms including the jaw openings 56, are pivoted away from one another to thereby open the clamping means, whereas during retraction of the piston rod 64, the clamping means closes to seize and clamp the guide rail.

Associated to each clamping means 40 is a sensing means 68 which in the example of embodiment comprises a photocell 70 including a light source 72 arranged opposite thereto. The sensing means 68 is disposed—viewed in the longitudinal direction of the guide rail 36—respectively at a predetermined distance ahead (upstream) of the associated clamping means 40 and, over the guide rail 36 and is laterally staggered such that the suspension loops 34 when sliding on the guide rail 36, will pass through the light beam of the light source 72 thereby generating a signal in the photocell 70 processed in an electronic control means (not shown) to form a pulse for opening a magnetic valve (not shown) associated with the power cylinder 66 of the following (downstream) clamping means 40. The pulse controlling the magnetic valve to open, owing to a corresponding configuration of the electronic circuit, can be maintained for a predetermined period of time sufficient to allow the suspension loop 34 to pass the opened clamping means. However, equally it will be possible to control the pulse end with the aid of the next sensing means 68 and to provide behind (downstream from) the last clamping means 40 another sensing means which when activated by the suspension loop, will disconnect the opening pulse for the last clamping means.

The photoelectric sensing means as shown in the drawing can be replaced by conventional sensing means, shown schematically as 168, especially by mechanical scanners operating electrical contacts.

FIGS. 3 to 5 and 7 to 10, in enlarged scale, illustrate the construction of the constricting and closing means 18 and a part of the loop feeding mechanism 20 by way of which the series arranged loops 34 disposed on a belt 74 in opened position, are fed to mechanical jaw 76 of the constricting and closing mechanism 18. The constricting and closing mechanism 18 comprises four such mechanical jaws 76, 78, 80, 82 disposed in pairs ahead of an behind a clipping unit 84 and pivotable about an axis 86 passing through an oblong hole 88 in the clipping unit 84. Disposed below the clipping unit is a counterpart 90, and driving means (not shown) are provided by means of which the mechanical jaws are swung in a known manner from the open position shown in FIG. 3 into the constricted position shown in FIG. 7, with the clipping unit 84 and its counterpart 90 being movable one against the other for setting two closing clamps in spaced relationship. The clipping unit 84, moreover, midway carries a cutting knife 94 which, during counter-movement of clipping unit and counterpart thereof, will engage a corresponding recess of the counterpart to sever the tubular casing material 98 constricted by the mechanical jaws 76, 78 and 80, 82, respectively simultaneously with the setting of the closing clamps 92 therebetween.

Constricting and closing mechanisms of this type are known in the art thus not requiring any description in closer detail.

The loop supply means 20 comprises a pulley 100 for belt 74 in the form of a plastic tape to which are adhered suspension loops 34 in opened condition at a longitudinal space by welding or cementing the legs thereof at 102. The belt at regular intervals is provided with perforations (not shown) engaged by the teeth of a notched wheel (not shown) indexing the belt to the next position in synchronism with charging, closing and severing of the sausages by respectively one graduation of the single-filed suspension loops 20.

Figure 3:
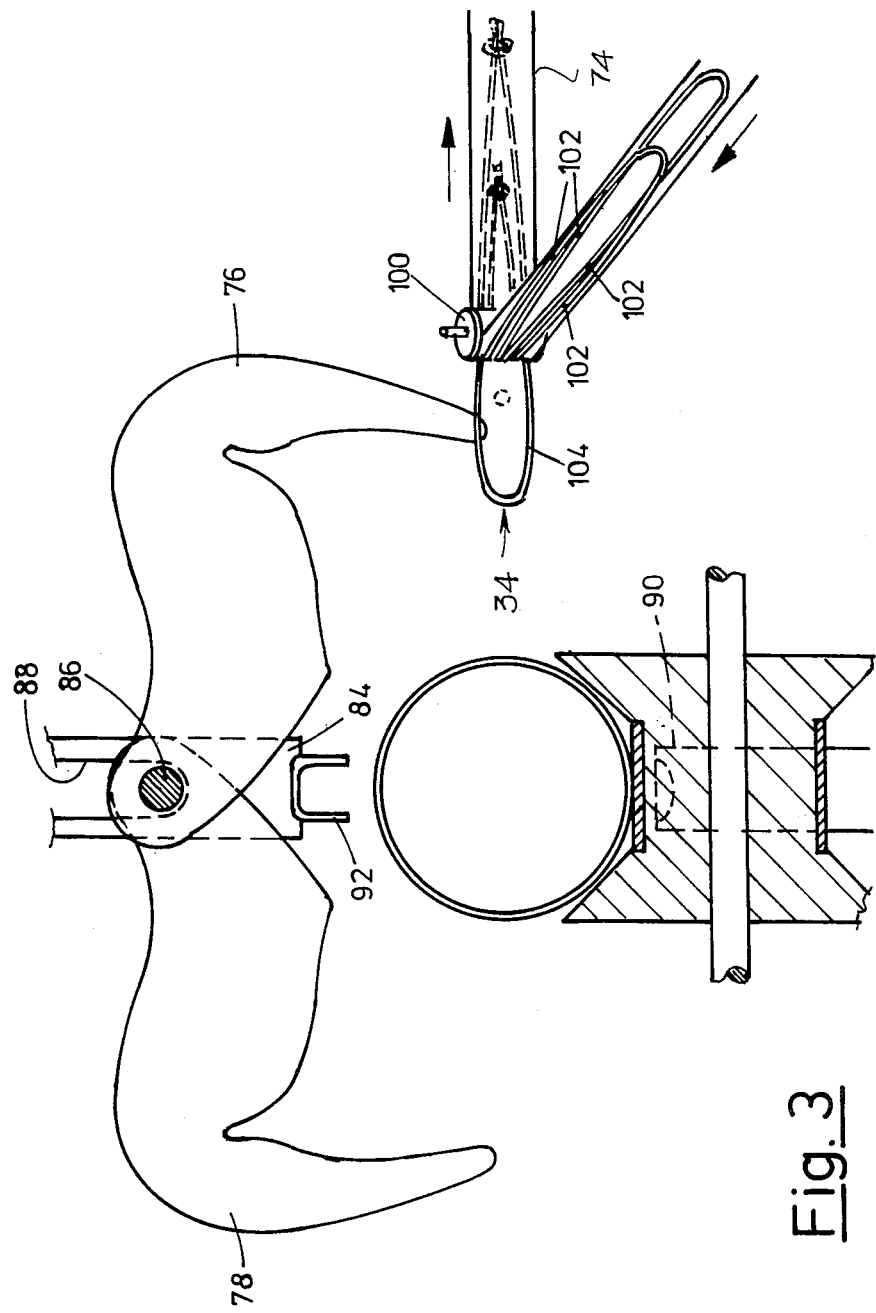
Figure 4:
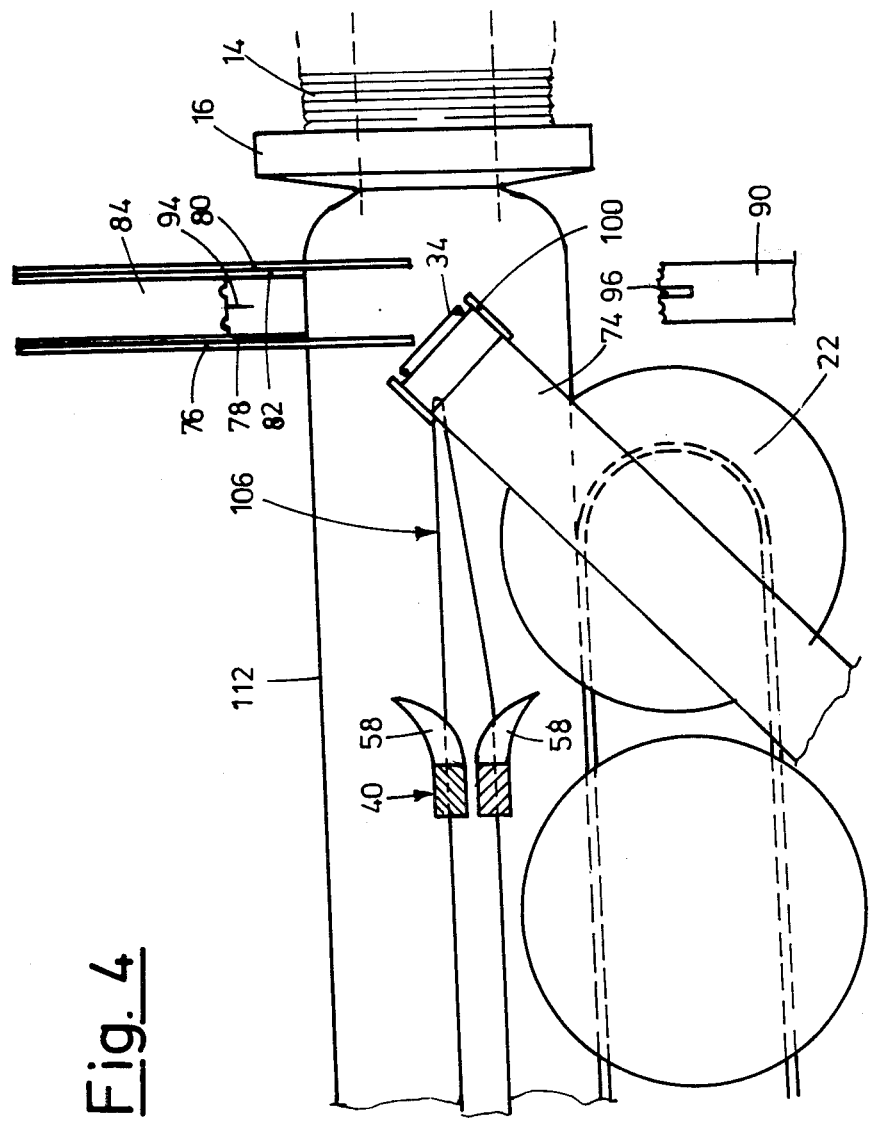
FIG. 4 is a side view of FIG. 3 during filling of a tubular casing section along the length of a sausage.
Figure 7:
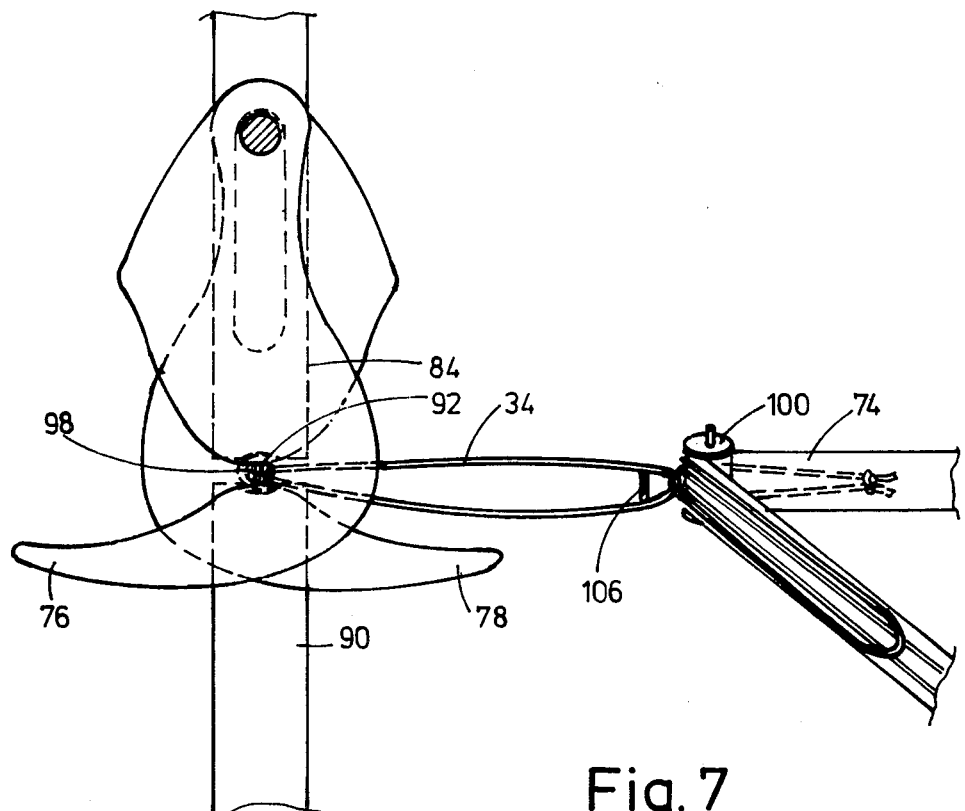
FIG. 7 is the same front view as shown in FIG. 3, with the constricting and closing tools being in operation after completion of the filling process.
Figure 8:
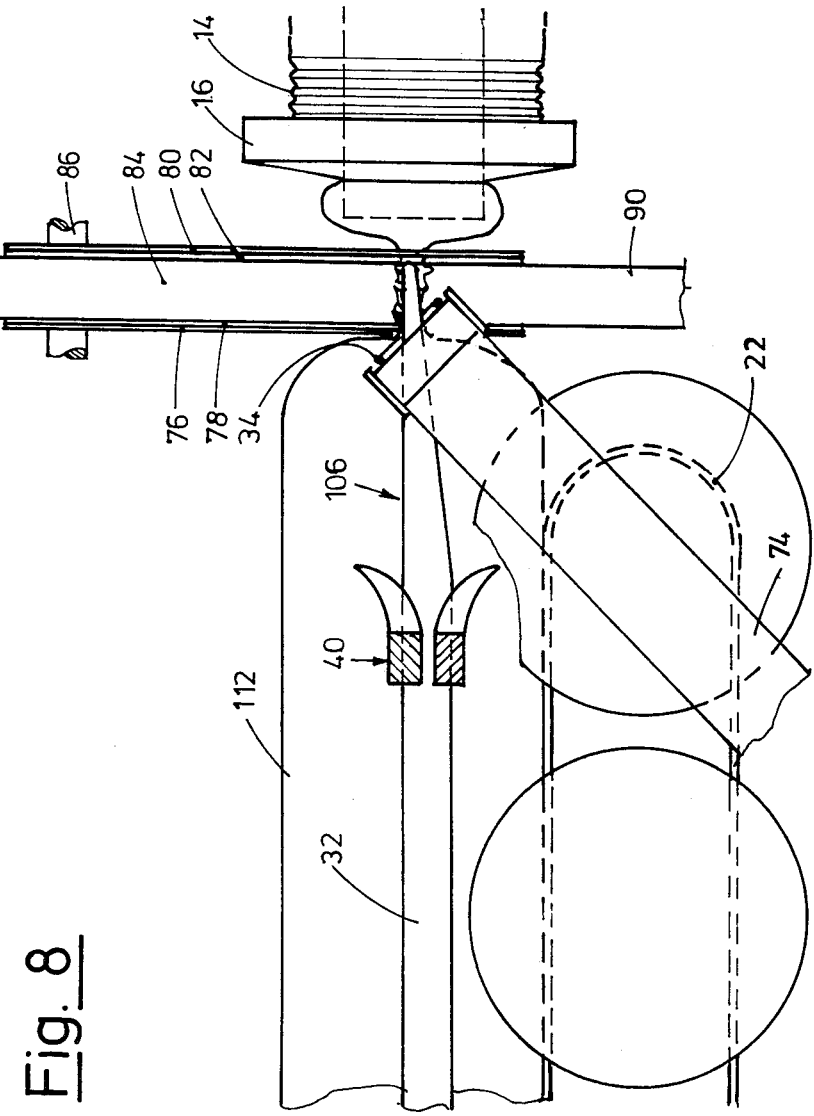
FIG. 8 is a side view of FIG. 7.
Figure 9:
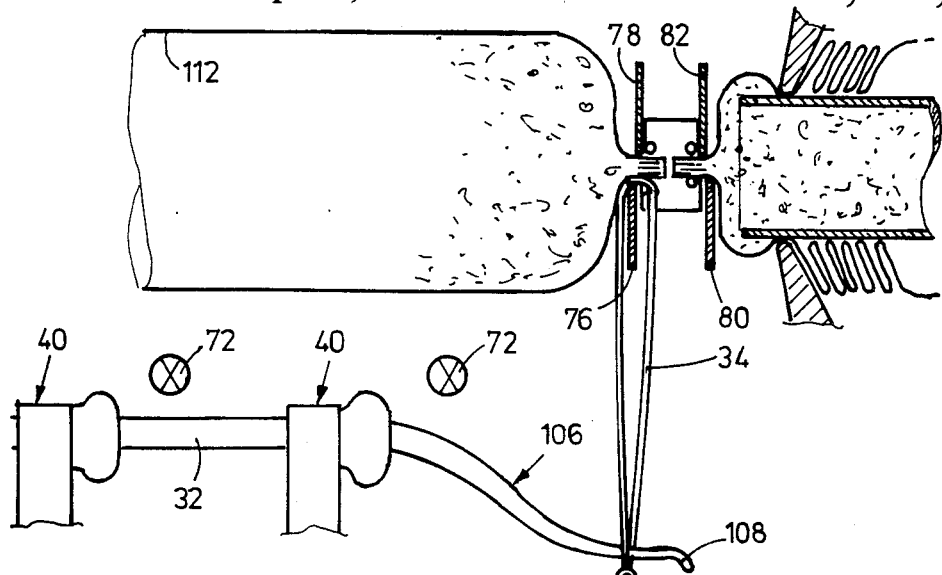
FIG. 9 is a plan view of FIG. 7.
Figure 10:
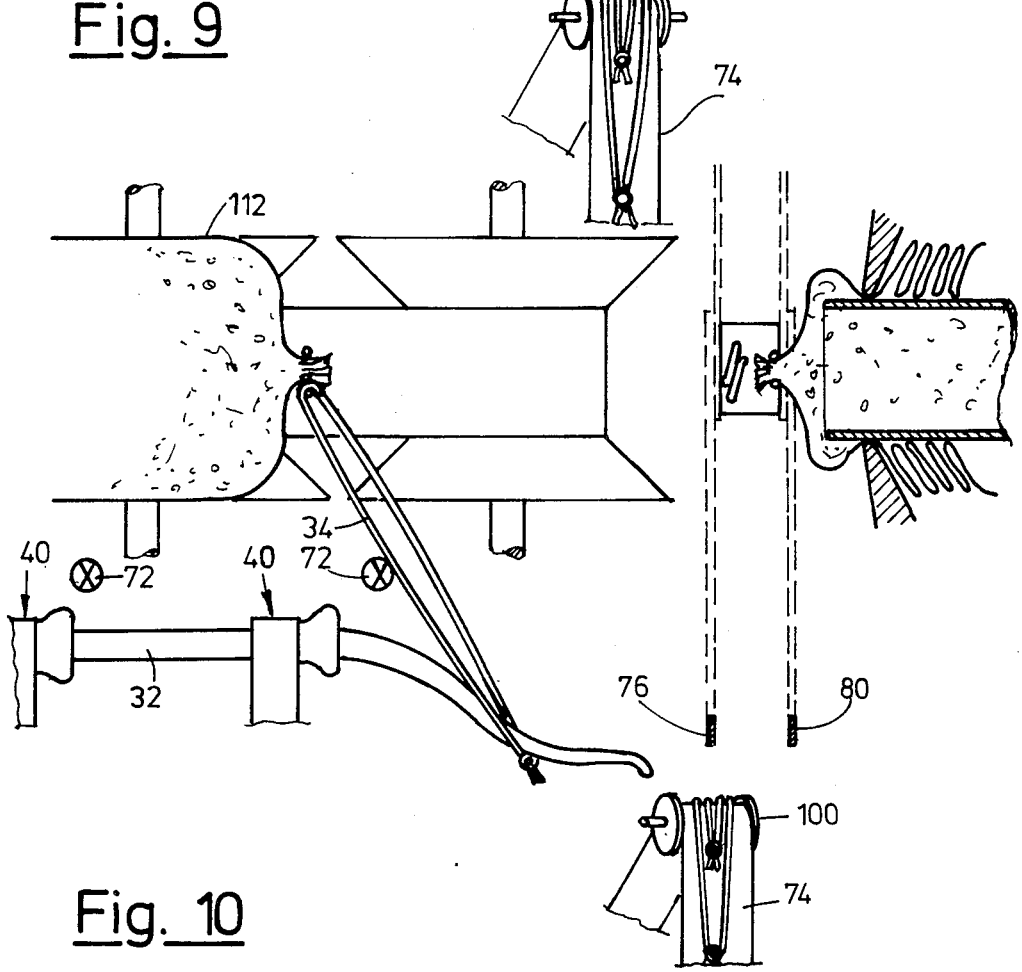
FIG. 10 is the same plan view as in FIGS. 5 and 9 at a later time during transporting away the severed sausage.

The axis of pulley 100 is, as is particularly revealed by FIGS. 4 and 8, inclined at an angle of 45° to the perpendicular or to the horizontal, and the suspension loops 34 are so arranged in series on the belt 74 that the knot ends thereof are advancing and are covered by the handle ends of one or several loops disposed ahead thereof in the feeding direction. This arrangement in conjunction with the obliquely positioned pulley 100, with each indexing step of the belt 74, will permit the handle 104 not secured to the belt, of each suspension loop 34 to freely project into the range of engagement of the mechanical jaw 76—as shown in FIGS. 3 to 5—to be seized by the latter during closure of the jaws and to be fed ahead of the closing clamp 92 and at the same time to be separated from the belt 74, as illustrated in FIGS. 7 to 9.

Figure 5:
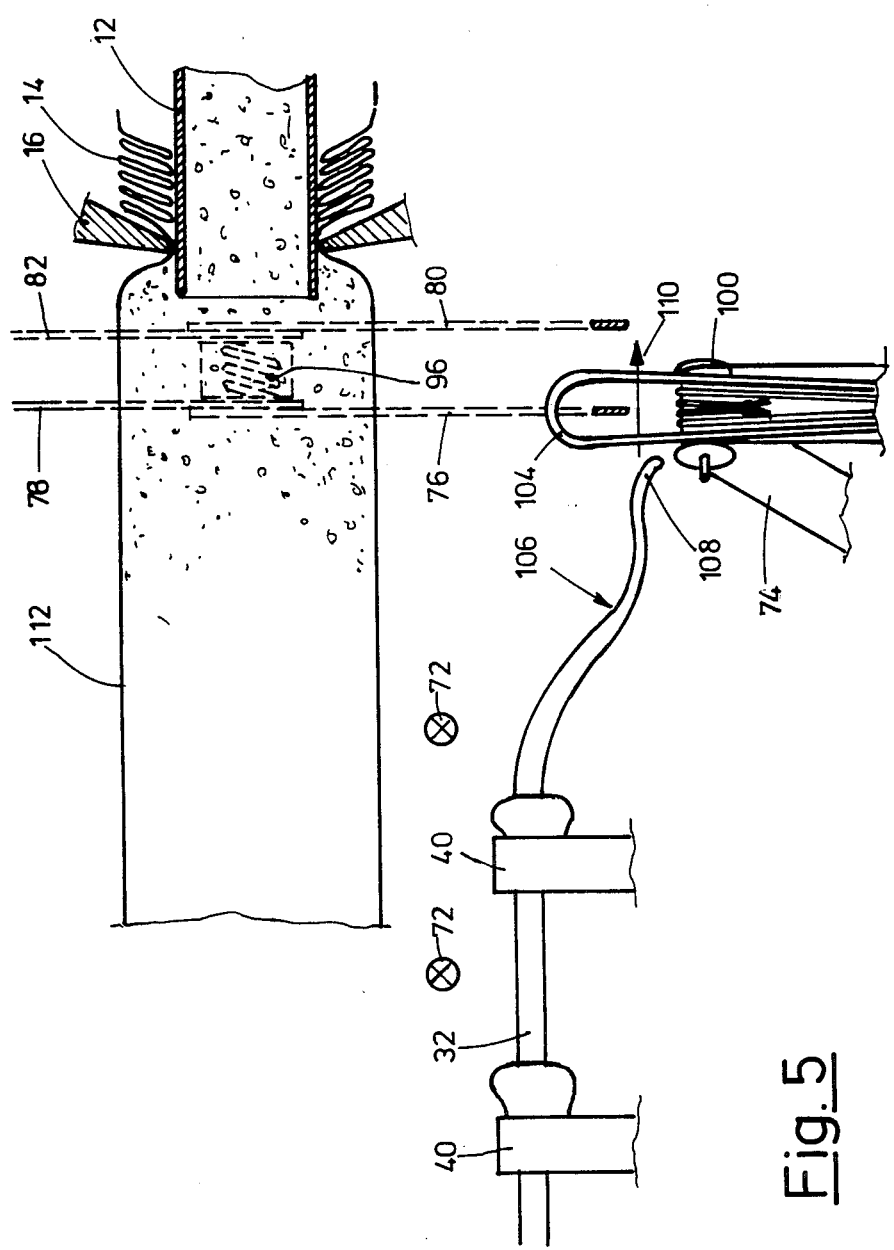
FIG. 5 is a plan view of FIGS. 3 and 4.

As previously mentioned, the raised, front upstream end of the guide rail 36 is formed as a gripper 106 that, with the power cylinder 46 (FIG. 2) retracted, terminates ahead (on the upstream side) of the loop feeding means 20 (FIGS. 4 and 5). The gripper 106 comprises a waved bent of the front portion of the guide rail 36 tapering in cross-section, which at the outermost end at 108 is again bent outwardly to form a catch hook 108. By extending power cylinder 46, guide rail 36 seized by the clamping means 40 is advanced in the direction of arrow 110 (FIG. 5) at the same moment when jaws 76 to 82 close, seizing, together with jaws 76, loop end 104 of suspension loop 34 so that, as shown in FIGS. 7 and 9, during further closing of the jaws the loop end is held by gripper 106.

Then follows, as described in the afore-going, the setting of the closing clamps and the severing of the stuffed casing sections 112 from the casing material 98 conveyed as a link sausage from the belt conveyor 22, after reopening of the mechanical jaws 76 to 82, to the curing or cooking stick 32 and transferred thereto. Simultaneously with the said conveying movement, power cylinder 46 is retracted (FIG. 10), and the suspension loop 34 dragged along by the sausage and will slide over guide rail 36, with the suspension loop 34, successively actuating the sensing means thereby releasing opening of the clamping mechanism 40 to enable the loop 34 to reach the other end of the guide rail 36 unhindered and to be passed from there to the curing or cooking stick 32 on which sausage 112 hanging thereon, virtually, is lined up in a suspending position.

The receiving means 26 may be provided with a switch drive (not shown) for the stepwise turning of the head 30; also, a counter may be provided for counting the number of sausages lined up on the curing or cooking stick 32 in order to generate a signal for the switch drive to index to the next position after a predetermined number having been reached. Equally, one of the stuffing mechanisms 68, in conjunction with the electronic control means, may be used as a counter. The one skilled in the art is aware of the steps required in this respect so that there is no need for a more detailed explanation.

It is apparent that the present invention is not restricted to the use of "closed" suspension elements, i.e. suspension loops. It will rather also be possible to use differently formed suspension elements, such as, for example, hooks, shafts having thickened heads guided into sectional grooves of the guide rail and of the curing or cooking sticks to be specifically formed for this purpose, and the like. In those cases it would not be required to hold the curing or cooking sticks in floating manner on one side, as would be inevitable when using suspension loops.

Figure 11:
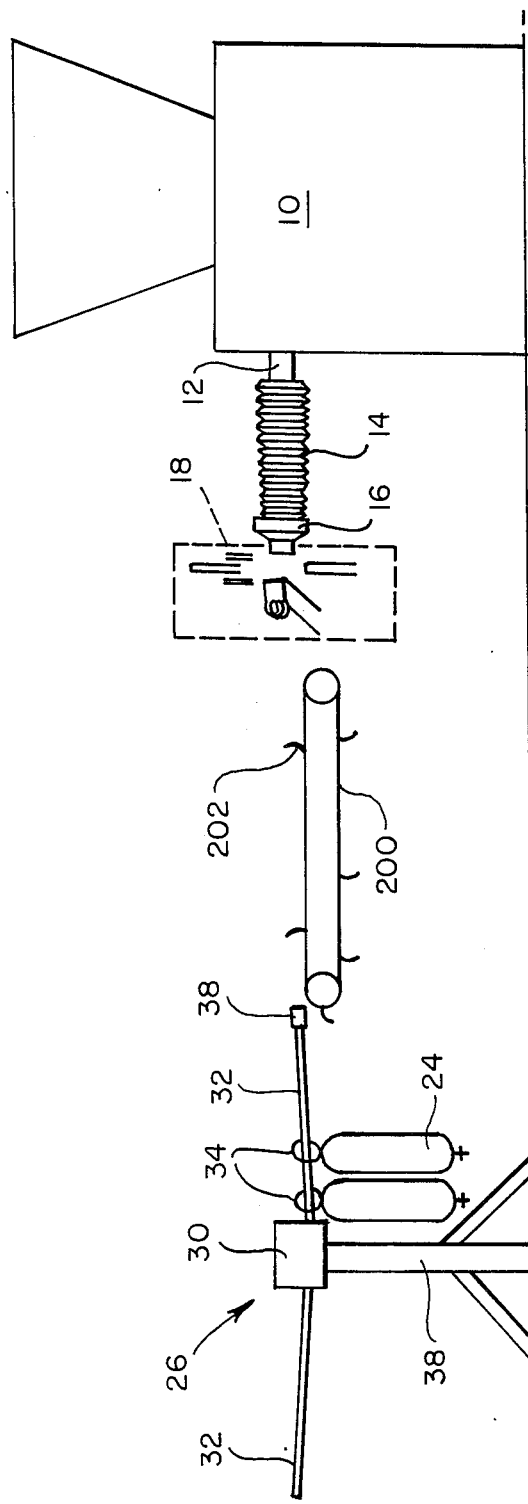
FIG. 11 is a schematic side view similar to FIG. 1 but showing another embodiment of the present invention.

Referring to FIG. 11, there is shown an apparatus wherein the guide means is formed by an endless drive 200, for example an endless tape or a chain drive, on which are provided one or several engaging hooks 202 which seize the suspension loops and feed them to the curing or cooking stick.

What is claimed is:

1. A method for stringing of link sausages manufactured by automatic stuffing machines, on curing or cooking sticks with the aid of suspension elements which, after filling, and during closing of the stuffed sausage casing section, individually, are placed in the path of a clamping means for closing and are secured to the link sausage by the latter, characterized by seizing the suspension elements with a guide member as the suspension elements are placed in the path of the clamping means, and feeding the suspension elements, along with the sausage tied thereto onto the curing or cooking stick.

2. A method according to claim 1, including keeping the guide member at a standstill, at least after tieing the suspension element into the clamping means, allowing the suspension element on the guide member to be slidingly advanced to the curing and cooking stick.

3. A method according to claim 2, including holding the guide member in an inclined position to utilize the gravitational force for the sliding movements of the suspension element.

4. A method according to claim 2, including using an artificially generated force to at least assist in the sliding movement of the suspension element on the guide member.

5. A method according to claim 3, including using an artificially generated force to at least assist in the sliding movement of the suspension element on the guide member.

6. A method according to claim 1, including moving the guide element itself for advancing the suspension element with the sausage tied thereto to the curing or cooking stick.

7. A method according to claim 1, including using premanufactured suspension loops during feeding or tieing and floatingly holding the curing or cooking sticks for receiving the suspension loops at one end.

8. An apparatus for stringing of link sausages manufactured by automatic stuffing machines in conjunction with a constricting means disposed in the vicinity of a charging tube opening of the automatic stuffing machine, associated to which is an apparatus for individually feeding pre-manufactured, opened suspension loops into the path of movement of one of the constricting tools, characterized by a gripping means positioned to be introduced into the suspension loop as the loop is fed along with the constricting tool, which gripping means forms a part of a guiding means for transferring the suspension loop with the sausage secured thereto to a curing or cooking stick.

9. An apparatus according to claim 8, characterized in that the gripper means is located at the one end of a guide rail extending substantially in the direction of the forcemeat ejection, with the other end thereof being adapted to be connected to the curing or cooking stick.

10. An apparatus according to claim 9, characterized in that the guide rail is arranged inclined downward toward the curing and cooking stick.

11. An apparatus according to claim 10, characterized in that the curing and cooking sticks are equally inclined.

12. An apparatus according to claim 9, characterized in that the guide rail is held by at least two clamping means which can be successively controlled to open for releasing the suspension loops sliding along the guide rail.

13. An apparatus according to claim 12, characterized in that associated to the clamping means are sensing means for detecting the sliding movement of the suspension loops on the guide rail for controlling the clamping means to temporarily open.

14. An apparatus according to claim 13, characterized in that the sensing means are formed as mechanical scanners.

15. An apparatus according to claim 13, characterized in that the sensing means are formed by photocells having oppositely arranged light sources.

16. An apparatus according to claim 9, characterized in that the clamping means and the sensing means are displaceably disposed longitudinally of the guide rail, and that an actuating means is provided which reciprocates in a controlled manner the clamping means and the sensing means for introducing the gripper into the suspension loop as they are fed.

17. An apparatus according to claim 9, characterized by a drivable conveyor means extending below the path of ejection of the sausage, by means of which conveyor means the sausages are transportable to the curing or cooking stick.

18. An apparatus according to claim 8, characterized in that the guide means is formed by an endless drive means on which are provided one or several engaging hook means for seizing the suspension loops and feeding them to the curing or cooking stick.

19. An apparatus according to claim 8, characterized by a holder for the curing or cooking sticks coupled to the guide means, comprising a frame and a head rotatable thereon and adapted to be indexed by equal graduation angles, having sockets for receiving a corresponding number of rods in radial arrangement of which respectively one is coupled to the guide means.

* * * * *